(12) United States Patent  
Fou et al.

(10) Patent No.: US 8,230,848 B2
(45) Date of Patent: Jul. 31, 2012

(54) BARBECUE GRILL

(76) Inventors: Augustine Fou, New York, NY (US); Joseph Fou, Dallas, TX (US)

( * ) Notice: Subject to any disclaimer, the term of this patent is extended or adjusted under 35 U.S.C. 154(b) by 247 days.

(21) Appl. No.: 11/894,853

(22) Filed: Aug. 22, 2007

(65) Prior Publication Data

US 2008/0047541 A1    Feb. 28, 2008

Related U.S. Application Data

(60) Provisional application No. 60/839,232, filed on Aug. 22, 2006.

(51) Int. Cl.
*A47J 37/07* (2006.01)

(52) U.S. Cl. ........ 126/25 R; 126/59.5; 126/77; 126/9 R; 126/41 R; 99/340; 99/482

(58) Field of Classification Search .............. 126/25 R, 126/59.5, 77, 9 R, 41 R; 99/340, 482
See application file for complete search history.

(56) References Cited

U.S. PATENT DOCUMENTS

| | | | | |
|---|---|---|---|---|
| 2,246,804 | A * | 6/1941 | Lipschutz | 426/314 |
| 3,788,301 | A * | 1/1974 | Terry | 126/59.5 |
| 5,048,406 | A * | 9/1991 | Cofer | 99/482 |
| 5,176,124 | A * | 1/1993 | Wrasse | 126/25 R |
| 5,347,935 | A * | 9/1994 | Whitaker | 110/240 |
| 5,582,094 | A * | 12/1996 | Peterson et al. | 99/445 |
| 6,019,035 | A * | 2/2000 | Jonas et al. | 99/482 |
| 6,095,132 | A * | 8/2000 | Ganard et al. | 126/41 R |
| 6,209,533 | B1 * | 4/2001 | Ganard | 126/25 R |
| 6,615,821 | B1 * | 9/2003 | Fisenko | 126/25 R |
| 7,156,087 | B1 * | 1/2007 | Churchill et al. | 126/25 R |
| 2003/0094169 | A1 * | 5/2003 | Alden | 126/25 R |
| 2004/0255926 | A1 * | 12/2004 | Waits et al. | 126/25 R |

* cited by examiner

*Primary Examiner* — Steven B McAllister
*Assistant Examiner* — Avinash Savani
(74) *Attorney, Agent, or Firm* — Charles A. Rattner

(57) ABSTRACT

A cooking surface for a grill includes a cylindrical fire column. Food placed on the grill surface directly above the fire column will be impinged by the heat of the heat source, made even more intense by the upward, directional flow of air through the fire column. Food placed on the grill surface but not directly above the fire column can be cooked with indirect heat.

14 Claims, 3 Drawing Sheets

BARBECUE GRILL

CROSS-REFERENCE TO RELATED APPLICATIONS

This application claims priority under 35 U.S.C. §119 to U.S. Provisional Patent Application Ser. No. 60/839,232 entitled "BARBECUE GRILL" filed in the name of Augustine Fou et al. on Aug. 22, 2006, the entirety of which is herein incorporated by reference.

TECHNICAL FIELD

The present disclosure generally relates to barbecue and smoker grills.

BACKGROUND OF THE DISCLOSURE

Typical barbecue grills have a chamber in which a heat source, such as charcoal or gas burners, is underneath the cooking surface where the food is placed. By placing the food directly above the heat source, direct cooking is achieved. Indirect cooking is achieved by placing the food off to the side and not directly above the heat source; or moving the heat source to the side. However, most barbecue grills do not achieve high enough temperatures to achieve the desirable browning or blackening of food items known as the maillard reaction in a short amount of time. It takes a long cooking process to achieve proper browning or blackening, in which case the food is overcooked.

Furthermore when barbecues are operated at the highest possible temperatures, for example when hardwood charcoal is used, the burning charcoal does not give off much aromatic smoke. Smoke is only given off when the wood is burning low, also known as smoldering.

Finally smokers which do use smoldering wood typically have the smoking source in a separate chamber that is connected to the main chamber in which the food resides. As such smokers cannot cook at the desired high temperatures.

Therefore, there is need for an improved grill which addresses these limitations of the prior art.

SUMMARY OF THE DISCLOSURE

The present disclosure is a grill which can cook at extremely high temperatures to achieve the desirable maillard reaction in a short amount of time and also flavor the food with aromatic smoke at the same time.

BRIEF DESCRIPTION OF THE DRAWINGS

Other objects, features, and advantages of the present disclosure will become apparent to one with skill in the art upon examination of the following drawings.

DETAIL DESCRIPTION OF THE PREFERRED EMBODIMENTS

Figure 1:
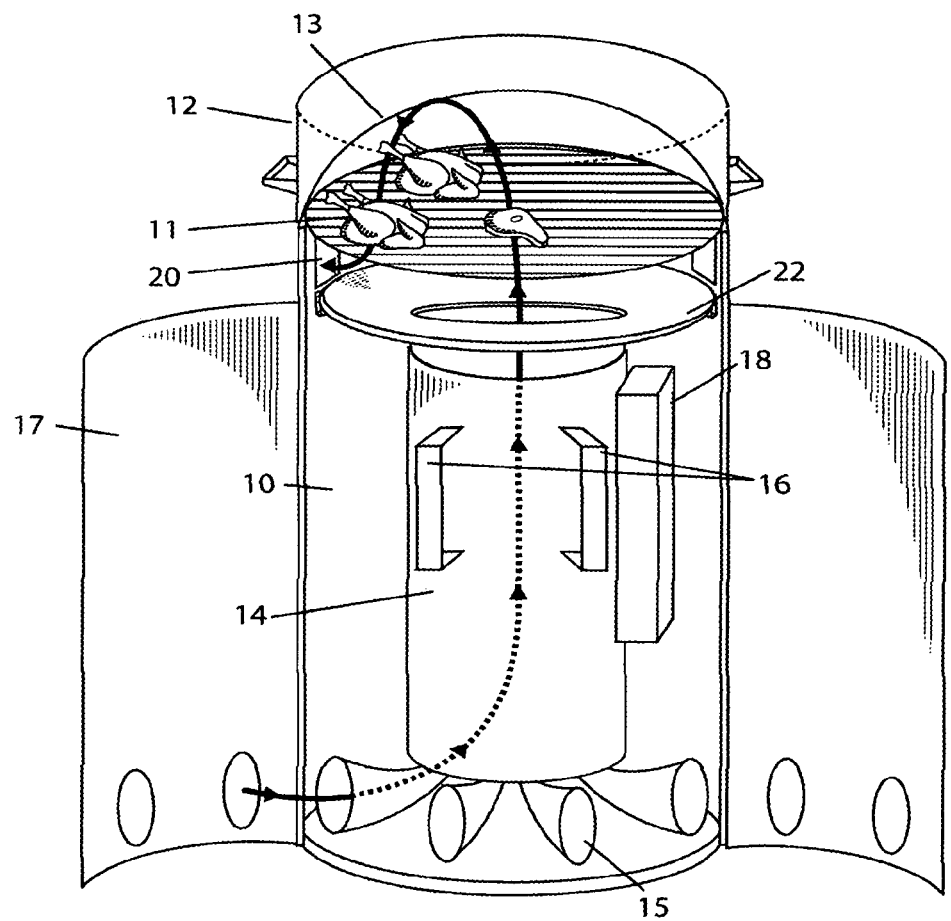
FIG. 1 is a first view of the barbecue grill of the present disclosure with its external doors open.

Reference will now be made to the details of the disclosure as illustrated in the drawings using reference numerals. As shown in FIG. 1, a preferred embodiment of the present disclosure is the wide cylindrical cooking chamber 10 whose walls consist of multiple internal layers of heat insulating materials and two external decorative layers that may be metallic. There is a cooking grill surface 11 and lid 12 with hemispherical inner lining 13. The cooking chamber contains a smaller cylinder inside of it and concentric to it, called the fire column 14. The fire column contains the heat source—for example charcoal briquettes or wood charcoal—and has air intakes 15 at its base and is open at the top. The fire column also has handles 16 so that it can be easily removed when the charcoal is spent. The fire column can be removed through double doors 17 on one side.

Figure 3:
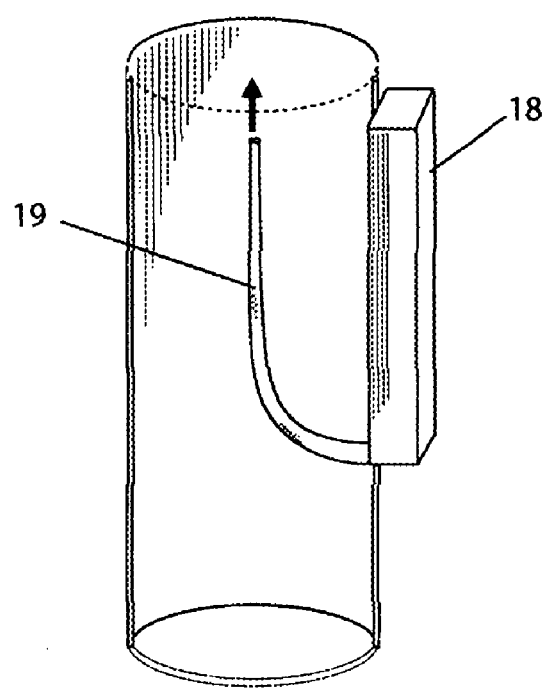
FIG. 3 is an illustration of a smoker attachment for the grill of FIGS. 1 and 2.

The fire column also has a smoking chamber attachment 18, also shown in detail in FIG. 3, mounted directly to the side wall. The smoking chamber contains the wood which is caused to smolder by the intense heat of the fire column and give off smoke which is injected into the center part of the fire column by directional airflow through metallic tube 19, also shown in detail in FIG. 3.

Food placed on the grill surface 11 directly above the circumference of the fire column 14 will be impinged by the heat of the heat source—e.g. hardwood charcoal—made even more intense by the upward, directional flow of air through the fire column, entering from its base through the intakes 15 and flowing straight up at the food placed above the fire column—creating a "jet engine" effect.

Figure 2:
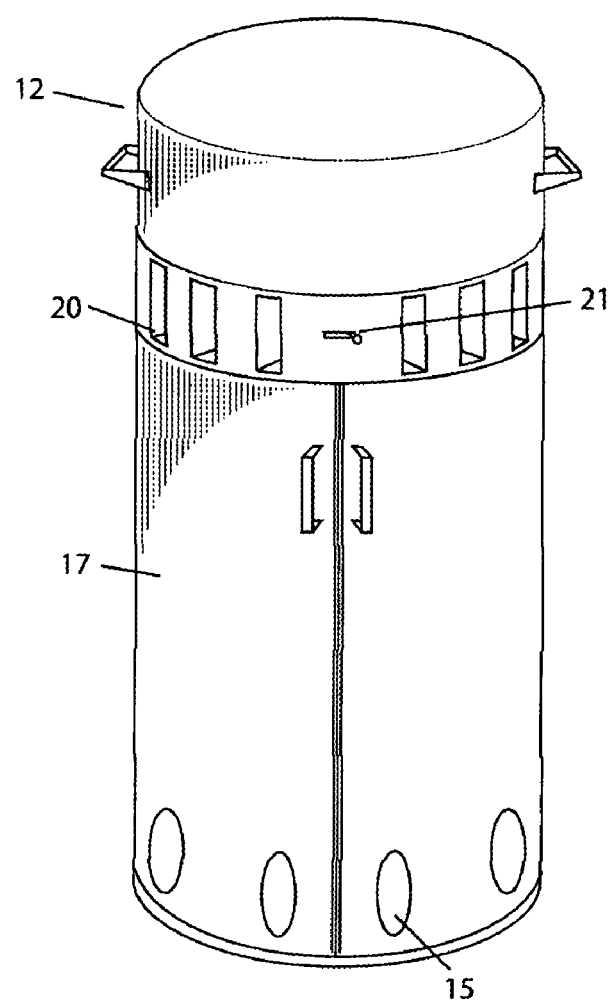
FIG. 2 is a second view of the grill of the present disclosure with its external doors closed.

Food placed on the grill surface 11 but NOT directly above the fire column 14 (i.e. outside a circumference of the fire column 14 but within a circumference of the grill surface 11) can be cooked with indirect heat. When the lid 12 is placed on the cooking chamber 10, the intense heat of the fire column rises to impinge upon the hemispherical inner lining of the lid 13, flows back downward over the food and downward through the grill surface until it finally exits through the exhaust vents 20. The sliding baffle 21 (see FIG. 2) can be moved to change the size of the exhaust vents and thus control the amount and speed of the airflow. This controls the intensity of the fire flowing upward through the fire column and thus the temperature and speed of cooking.

A conical drip pan 22 collects drippings from the food and channels the drippings back into the central fire column, both to make the fire even more intense and also to add more flavor to the food.

In this way, the present disclosure solves the shortcomings of both barbecue grills and smoking grills—cannot impart good smoke flavor and cannot cook at extremely high heat, respectively. The present disclosure enables cooking at extremely high temperatures by utilizing directional airflow to "fan the flame" and channel the heat directly at the food. It also imparts better smoke flavor than conventional grills through the smoke injector.

The foregoing description has been presented for purposes of illustration and description. It is not intended to be exhaustive or to limit the disclosure to the precise forms disclosed. Obvious modifications or variations are possible in light of the above teachings. The embodiment or embodiments discussed, however, were chosen and described to provide the best illustration of the principles of the disclosure and its practical application to thereby enable one of ordinary skill in the art to utilize the disclosure in various embodiments and with various modifications as are suited to the particular use contemplated. All such modifications and variations, are within the scope of the disclosure as determined by the appended claims when interpreted in accordance with the breadth to which they are fairly and legally entitled.

What is claimed is:

1. A grill apparatus, comprising:
   a cooking chamber having an outer wall;
   the outer wall having a door disposed on a side surface;
   a grill surface having a first circumference and disposed at a top of the cooking chamber;
   the outer wall having a plurality of vents disposed circumferentially around the outer wall above the door and below the grill surface with a sliding baffle for controlling the size of the plurality of vents, such that the temperature near the grill surface may be controlled by the sliding baffle;

a column disposed beneath the grill surface within the outer wall of the cooking chamber, the column having an open top portion with a second circumference less than the first circumference, the column further having an interior for holding a heat source on a base thereof and for providing directional heatflow from the heat source toward the open top portion and the grill surface;

a conical drip pan disposed above the column and below the grill surface within the cooking chamber, the conical drip pan having an opening in a bottom surface thereof and disposed over the open top portion of the column, the conical drip pan for collecting drippings from the grill surface and directing the drippings into the top portion of the cylindrical column;

a smoking chamber attachment mounted to a side wall of the cylindrical column and disposed beneath the grill surface and entirely within the outer wall, the smoking chamber attachment having a chamber for smoldering a substance using only heat from the heat source in order to generate smoke; and a tube extending from the smoking chamber attachment through the side wall into the interior of the column, the tube for directing smoke generated within the chamber to the interior of the column, thereby flavoring a food placed on the grill surface using the smoke, wherein the column is removable from the cooking chamber via the door.

2. The apparatus of claim 1, wherein the column further comprises an air intake vent disposed near the base of the column.

3. The apparatus of claim 2, the door further comprising at least opening through the outer wall that is in communication with the air intake vent of the column.

4. The apparatus of claim 1, wherein the column further comprises a handle on the side wall for enabling the removal of the column from the cooking chamber via the door.

5. The apparatus of claim 1, wherein the column is substantially cylindrical.

6. The apparatus of claim 1, wherein food placed on the grill surface within the second circumference of the column will be cooked with greater intensity than food placed within the first circumference of the grill surface but outside the second circumference.

7. The apparatus of claim 1, further comprising a lid having a hemispherical inner surface for distributing indirect heat around the grill surface.

8. The apparatus of claim 1, wherein the substance comprises wood.

9. A cooking and smoking apparatus, comprising:
a cooking chamber having an outer wall;
the outer wall having a door disposed on a side surface;
a grill surface having a first circumference and disposed at a top of the cooking chamber;
a cylindrical column disposed beneath the grill surface within the outer wall of the cooking chamber, the cylindrical column having an open top portion with a second circumference less than the first circumference, the cylindrical column further having an interior for holding a heat source on a base thereof and for providing directional heat flow from the heat source toward the open top portion and the grill surface;
a conical drip pan disposed above the cylindrical column and below the grill surface within the cooking chamber, the conical drip pan having an opening in a bottom surface thereof and disposed over the open top portion of the column, the conical drip pan for collecting drippings from the grill surface and directing the drippings into the top portion of the cylindrical column;
a smoking chamber attachment mounted to a side wall of the cylindrical column and disposed beneath the grill surface entirely within the cooking chamber, the smoking chamber attachment having a chamber for smoldering a substance using only heat from the heat source in order to generate smoke; and
a tube extending from the smoking chamber attachment through the side wall into the interior of the cylindrical column, the tube for directing smoke generated within the chamber to the interior of the cylindrical column, thereby flavoring a food placed on the grill surface using the smoke, wherein the cylindrical column is removable from the cooking chamber via the door.

10. The apparatus of claim 9, wherein the substance comprises wood.

11. The apparatus of claim 9, the outer wall having a plurality of vents disposed circumferentially around the outer wall above the door and below the grill surface with a sliding baffle for controlling the size of the plurality of vents, such that the temperature near the grill surface may be controlled by the sliding baffle.

12. A cooking and smoking apparatus, comprising:
a cooking chamber having an outer wall;
the outer wall having a door disposed on a side surface;
a grill surface having a first circumference and disposed at a top of the cooking chamber;
the outer wall having a plurality of vents disposed circumferentially around the outer wall above the door and below the grill surface with a sliding baffle for controlling the size of the plurality of vents, such that the temperature near the grill surface may be controlled by the sliding baffle;
a column disposed beneath the grill surface within the outer wall of the cooking chamber, the column having an open top portion with a second circumference less than the first circumference, the column having an interior for holding a heat source on a base thereof and for providing directional heat flow from the heat source toward the open top portion and the grill surface;
a smoking chamber attachment mounted to a side wall of the column and disposed beneath the grill surface entirely within the cooking chamber, the smoking chamber attachment having a chamber for smoldering a substance using only heat from the heat source in order to generate smoke; and
a tube extending from the smoking chamber attachment through the side wall into the interior of the column, the tube for directing smoke generated within the chamber to the interior of the column, thereby flavoring a food placed on the grill surface using the smoke, wherein the cylindrical column is removable from the cooking chamber via the door.

13. The apparatus of claim 12, wherein the substance comprises wood.

14. The apparatus of claim 12, further comprising a conical drip pan disposed above the column and below the grill surface within the cooking chamber, the conical drip pan having an opening in a bottom surface thereof and disposed over the open top portion of the column, the conical drip pan for collecting drippings from the grill surface and directing the drippings into the top portion of the column.

* * * * *